US012756275B2

(12) United States Patent
Koch et al.

(10) Patent No.: US 12,756,275 B2

(45) Date of Patent: Oct. 6, 2026

(54) ELECTRIC MOTOR OF A MOTOR VEHICLE

(71) Applicant: Brose Fahrzeugteile SE & Co. Kommanditgesellschaft, Würzburg, Würzburg (DE)

(72) Inventors: Kevin Koch, Fürth (DE); Michael Düncher, Würzburg (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 577 days.

(21) Appl. No.: 18/320,256

(22) Filed: May 19, 2023

(65) Prior Publication Data

US 2023/0291283 A1 Sep. 14, 2023

Related U.S. Application Data

(63) Continuation of application No. PCT/EP2021/082141, filed on Nov. 18, 2021.

(30) Foreign Application Priority Data

Nov. 19, 2020 (DE) ..................... 10 2020 214 597.0

(51) Int. Cl.

| | |
|---|---|
| ***H02K 11/01*** | (2016.01) |
| ***B62D 5/04*** | (2006.01) |
| ***H02K 3/52*** | (2006.01) |
| ***H02K 5/06*** | (2006.01) |
| ***H02K 11/33*** | (2016.01) |

(52) U.S. Cl.

CPC ....... *H02K 11/0141* (2020.08); *B62D 5/0403* (2013.01); *H02K 3/522* (2013.01); *H02K 5/06* (2013.01); *H02K 11/33* (2016.01)

(58) Field of Classification Search

CPC ...... H02K 11/0141; H02K 3/522; H02K 5/06; H02K 11/33; H02K 5/225; B62D 5/0403

See application file for complete search history.

(56) References Cited

U.S. PATENT DOCUMENTS

| | | | |
|---|---|---|---|
| 7,211,914 | B2 | 5/2007 | Hofmann et al. |
| 10,340,767 | B2 | 7/2019 | Atarashi et al. |

(Continued)

FOREIGN PATENT DOCUMENTS

| | | | | |
|---|---|---|---|---|
| BR | 112020015551 A2 * | 2/2021 | ............. H02K 15/32 |
| CN | 110771016 A | 2/2020 | |

(Continued)

*Primary Examiner* — Mohamad A Musleh

(74) *Attorney, Agent, or Firm* — Laurence A. Greenberg; Werner H. Stemer; Ralph E. Locher

(57) ABSTRACT

An electric motor of a motor vehicle, in particular a steering motor, includes a housing having a motor compartment and an electronics compartment. The motor compartment and the electronics compartment are separated by a housing wall that has a plurality of openings. A stator is situated in the motor compartment and an electronics system is situated in the electronics compartment. The stator and the electronics system electrically contact one another through phase connections which project through the openings. A separating element is situated between the stator and the electronics system. The separating element at least partially covers the openings and the housing wall.

9 Claims, 3 Drawing Sheets

(56) References Cited

U.S. PATENT DOCUMENTS

| | | | | |
|---|---|---|---|---|
| 10,971,976 | B2 * | 4/2021 | Hagiwara | G01L 5/221 |
| 11,522,407 | B2 | 12/2022 | Ueno et al. | |
| 11,831,209 | B2 * | 11/2023 | Ichikawa | H02K 11/0141 |
| 2012/0039729 | A1 * | 2/2012 | Horng | H02K 9/227 310/65 |
| 2012/0104878 | A1 | 5/2012 | Heilman et al. | |

FOREIGN PATENT DOCUMENTS

| | | | | |
|---|---|---|---|---|
| DE | 19517667 | A1 * | 11/1996 | H02K 9/227 |
| DE | 202004010513 | U1 | 12/2005 | |
| DE | 102006036523 | A1 | 1/2008 | |
| EP | 1523087 | A1 * | 4/2005 | H02K 11/33 |
| JP | 6596884 | B2 * | 10/2019 | H02K 3/522 |

* cited by examiner

ELECTRIC MOTOR OF A MOTOR VEHICLE

CROSS-REFERENCE TO RELATED APPLICATION

This application is a continuation, under 35 U.S.C. § 120, of copending International Patent Application PCT/EP2021/082141, filed Nov. 18, 2021, which designated the United States; this application also claims the priority, under 35 U.S.C. § 119, of German Patent Application DE 10 2020 214 597.0, filed Nov. 19, 2020; the prior applications are herewith incorporated by reference in their entirety.

FIELD AND BACKGROUND OF THE INVENTION

The invention relates to an electric motor of a motor vehicle.

Motor vehicles have a plurality of adjustment drives, each of which has an electric motor, through the use of which an adjustment part is moved. Electric steering, such as power steering, for example, is used to simplify a steering movement in the motor vehicle. In so doing, an electric motor (steering motor) usually acts on a steering train which rotates during steering and transversely moves a toothed rack. The toothed rack is coupled to the wheels of the motor vehicle which are to be moved during the steering. In one alternative, the electric motor acts directly on the toothed rack and moves the toothed rack in a transverse direction. Through the use of the electric motor, when suitably controlled, an unintentional steering angle is also avoided, for example, when driving over a pothole, for the purpose of which the angular movement of the steering wheel of the motor vehicle is monitored.

The electric motor is usually configured as a brushless DC motor (BLDC) and has multiple electrical coils which are energized by using an electronics system. In the event of a short circuit of the individual electrical coils, for example, due to inadvertent contact with an electrically conductive object, it is possible that the electric motor becomes blocked, and so steering the motor vehicle is no longer possible or at least becomes difficult. As a safeguard against such a situation, the individual components are usually disposed in a common housing which is comparatively robust. A metal is usually used as a material for the housing.

It is possible, however, in the case of comparatively large manufacturing tolerances, that the individual components, such as, for example, the electrical coils, come into electrical contact with the housing or that an electric arc forms between the individual components and the housing. That also adversely affects the mode of operation of the electric motor, for example, causing the electric motor to become blocked. In order to avoid that situation, the individual components are therefore spaced comparatively far away from the inner housing walls and therefore an air gap forms between the individual components and the inner housing walls. Consequently, more space is required.

It is also necessary to protect the individual components of the electronics system against particles which can also adversely affect the mode of operation of the electronics system. For example, such particles can result in a short circuit between strip conductors of a printed circuit board of the electronics system. In order to avoid that, all components of the electric motor, in particular electrical coils, are usually comparatively thoroughly cleaned before installation, which increases manufacturing costs. Alternatively or in combination therewith, the electronics system is extrusion-coated with plastic, which also results in increased manufacturing costs. Cooling the electronics system is also made difficult in that way.

SUMMARY OF THE INVENTION

It is accordingly an object of the invention to provide a particularly suitable electric motor of a motor vehicle, which overcomes the hereinafore-mentioned disadvantages of the heretofore-known motors of this general type and in which, in particular, manufacturing costs are reduced and, preferably, quality is increased.

With the foregoing and other objects in view there is provided, in accordance with the invention, an electric motor of a motor vehicle, in particular a steering motor, comprising a housing which has a motor compartment and an electronics compartment, which are separated by a housing wall having multiple openings, a stator is disposed in the motor compartment and an electronics system is disposed in the electronics compartment, the stator and the electronics system are in electrical contact with each other by using phase connections which protrude through the openings, and a separating element is disposed between the stator and the electronics system, through the use of which the openings and the housing wall are at least partially covered.

Advantageous developments and embodiments are the subject matter of the dependent claims.

The electric motor is an integral part of a motor vehicle. The electric motor is suitable, in particular provided and configured, for this purpose. The motor vehicle is preferably land-bound and includes, in particular, one or multiple wheel(s), through the use of which contact with a roadway takes place. In particular, it is possible to position the motor vehicle substantially arbitrarily on the roadway. In other words, the motor vehicle is not rail-guided. The motor vehicle is, for example, a commercial vehicle, such as a truck or a bus. It is particularly preferred, however, when the motor vehicle is a passenger car.

The electric motor is suitably a synchronous machine. The electric motor is, for example, a brushed commutator motor. It is particularly preferred, however, when the electric motor is configured without a brush and preferably is a brushless DC motor (BLDC). Preferably, the electric motor is an integral part of an auxiliary unit, such as an adjustment drive. The adjustment drive has an adjustment part which is moved along an actuation distance by using the electric motor during operation.

In one preferred embodiment of the invention, the adjustment drive is a power steering system and the adjustment part is, in particular, either a steering train, through the use of which a toothed rack is moved, or the toothed rack itself, wherein at least one of any of the wheels of the motor vehicle is pivoted about a substantially perpendicular axis by the toothed rack. In other words, the electric motor is a steering motor. The steering motor, for example, assists a steering movement generated by a driver of the motor vehicle. Alternatively, the steering movement is generated by the steering motor itself, for example, depending on a signal which was generated by the assistance system, or depending on an actuation of a steering wheel, wherein the steering wheel is coupled, for example, merely by signaling, to the further components of the steering system, such as to the steering train or to the toothed rack, although not mechanically.

In one alternative, the electric motor is an integral part of an electric window lifter, an electric motor-operated seat adjuster, an electric motor-operated tailgate, or an electric sliding roof. In one further alternative, the electric motor is an integral part of a massage device of a vehicle seat. In one further alternative, the auxiliary unit is a pump, such as, for example, a lubricant pump, in particular a transmission oil or motor oil pump. In one further alternative, the adjustment drive is a water pump, an air-conditioning compressor, or a fan unit, such as a radiator fan or a heater fan (HVAC).

The electric motor has a housing, which includes a motor compartment and an electronics compartment, which are also referred to as the motor area and the electronics area, respectively. The two compartments/areas are separated by a housing wall, which is also an integral part of the housing. In particular, the housing is hollow cylindrical and the housing wall is disposed substantially perpendicularly to the axis of the hollow cylinder. The two compartments (areas) are therefore both cup-shaped. The housing is advantageously a single piece, which simplifies production. Advantageously, the housing is made of a metal, such as a steel or an aluminum, i.e., for example, pure aluminum or an aluminum alloy. Weight is therefore not excessively increased. Robustness, however, is increased. Preferably, the housing is created by using cold extrusion or by using pressure die casting.

A stator is disposed in the motor compartment. The stator advantageously includes multiple electrical coils. Advantageously, the stator has one or multiple element(s), through the use of which the individual electrical coils are stabilized with respect to one another, for example, a laminated core. In particular, the electrical coils are divided over multiple (electrical) phases, for example, two phases or three phases, wherein the same number of electrical coils is assigned to each of the electrical phases. The electrical phases are connected, for example, to form a delta or star connection. The connection is established, in particular, by using an interconnection ring of the stator which forms, in particular, an end face of the stator. Alternatively, the electrical coils are connected independently of the stator.

Preferably, the electric motor also has a rotor, which is set into rotation by the stator during operation. The rotor advantageously has one or multiple permanent magnet(s). In particular, the stator circumferentially surrounds the rotor, and so the electric motor has an internal rotor. The rotor is, in particular, also disposed in the motor compartment and preferably fastened to a motor shaft.

An electronics system is disposed in the electronics compartment and has, for example, one or multiple printed circuit board(s). The electronics system is used for energizing the stator, in particular the electrical coils, and is suitable, advantageously provided and configured, for this purpose. In particular, the electronics system has one or multiple semiconductor switch(es), such as power semiconductor switches, for example, field effect transistors, for example, MOSFETs, IGBTs or GTOs. The semiconductor switches are advantageously electrically connected to one another to form a bridge circuit which is preferably adapted to the number of possible phases of the stator. In particular, a so-called B6 circuit is realized.

The electronics system is in electrical contact with the stator, the electrical contact being established by a number of phase connections. The number of phase connections is advantageously adapted to the number of possible phases of the electric motor and, for example, is equal to the number of phases, in particular when the phases are connected to one another to form a delta connection. If the electrical phases are connected to one another to form a star connection, it is suitable when the number of phase connections is equal to the number of phases plus one (1).

The housing wall has multiple openings, wherein the number of openings is advantageously equal to the number of phase connections. The phase connections protrude through the openings, wherein, in particular, one of the phase connections is assigned to one opening in each case.

Advantageously, the phase connections are spaced apart from an edge of the particular opening, and so an electrical short circuit is avoided there. Preferably, the distance between the phase connections and the edge of the openings is greater than 3 mm, 5 mm or 1 cm. It is therefore ensured that an electric arc will not form between the phase connections and the edge of the openings. In addition, there is no need for an additional element for electrically insulating the phase connections and the edge of the openings.

The phase connections are made, for example, of a metal, and preferably in the form of strips. In particular, the phase connections are made of sheet metal and, preferably, copper sheet strips in each case. Advantageously, the phase connections are fastened to the stator, and so the phase connections are guided through the openings during assembly when the stator is introduced into the motor compartment. It is suitable when the phase connections are each integral with an integral part of the stator, such as at least one of the possible electrical coils or an interconnection ring which is used to connect the individual electrical coils to one another to form the possible phases or to form the possible delta/star connection. In the assembled state, the phase connections are in electrical contact with the electronics system, in particular with the possible bridge circuit. Advantageously, the phase connections are each configured as a knife contact and engage into corresponding counter-contacts of the electronics system, which facilitates assembly.

The electric motor also has a separating element, which is disposed between the stator and the electronics system. In particular, the separating element is disposed in parallel to the housing wall. The openings and the housing wall are at least partially covered by the separating element. An additional component is therefore present between the stator and the electronics system, wherein the size of the openings is reduced by the separating element. Consequently, it is made difficult for particles to pass between the motor compartment and the electronics compartment, wherein the particles arise, for example, due to wear of integral parts of the electric motor disposed in the motor compartment or are located there after production.

In summary, an exchange of particles between the two compartments is also avoided or at least unlikely when (critical) particles are present. Due to the separating element, it is therefore not necessary to comprehensively clean the individual integral parts of the stator and any other integral parts of the electric motor, which are disposed in the motor compartment, which is why one manufacturing step can be dispensed with and thus manufacturing costs are reduced. Moreover, these components can have a greater residual dirt requirement. It is also possible to select comparatively large production tolerances for the housing and the phase connections. It is only necessary that the housing and the phase connections be spaced apart from one another in the assembled state. The size of the openings between the motor compartment and the electronics compartment is reduced by the separating element, wherein it is only there that an appropriate compensation is implemented. Therefore, manufacturing costs are reduced. Since the openings are merely covered and the separating element is not disposed within the openings, it is possible to select comparatively large production tolerances for both.

Moreover, it is possible to construct the separating element to be air-permeable or at least semi-permeable, thereby reliably enabling the components of the electric motor disposed in the motor compartment to be ventilated. Since only one single separating element is present, assembly is simplified and it is not necessary to adapt individual elements to an assigned opening in each case. Manufacturing costs are therefore reduced. Since the housing wall is at least partially covered by the separating element, direct mechanical contact of the electronics system or of the stator with the housing wall is avoided, thereby avoiding damage to the housing wall.

For example, the cross-section of the housing is substantially round and the housing wall is also circular. Advantageously, the separating element is also round/circular in this case. In this case, for example, the outer diameter of the separating element is larger than the inner diameter of the housing, and the separating element therefore has a bent edge. Sealing is therefore improved. It is particularly preferred, however, when the outer diameter of the separating element is (slightly) smaller than the inner diameter of the housing. Assembly is simplified in this way. For example, the edge of the separating element has notches or any other features. Therefore, engagement at the separating element and, therefore, assembly, are facilitated. A tangential alignment is also realized in this way. It is particularly preferred, however, when the outer contour of the separating element is smooth. Manufacture is simplified in this way.

In particular, the housing wall has a mounting for a bearing, and so the housing wall functions as a B-side bearing shield. Advantageously, the housing wall has a collar, through the use of which the bearing is accommodated. Therefore, assembly is simplified. The possible motor shaft is preferably supported by the bearing. For example, the motor shaft ends at the bearing. It is particularly preferred, however, when the motor shaft is guided through the housing wall by the bearing, and so the motor shaft is disposed by its end at least partially in the electronics compartment. Preferably, the electronics system has a speed sensor which interacts with this end of the motor shaft. It is therefore made possible to actuate the stator depending on the detected speed of the motor shaft, wherein complex wiring is not necessary. It is suitable when the separating element is ring-shaped, wherein the inner diameter of the separating element is advantageously slightly larger than the outer diameter of the collar. Therefore, tolerance compensation is also established there, which simplifies assembly.

For example, the separating element is disposed between the housing wall and the electronics system. It is particularly preferred, however, when the separating element is disposed between the housing wall and the stator. In this way, it is ensured that the stator does not rest directly against the housing wall. When the phase connections are fastened to the stator, the separating element is also prevented from being spaced apart from the housing wall when the phase connections are introduced through the separating wall into the openings. Therefore, robustness is increased and assembly is simplified.

For example, the separating element is rigid. It is particularly preferred, however, when the separating element is film-like and therefore has a thickness of less than 0.5 mm or 0.1 mm. In this way, space required and weight are substantially not increased. Preferably, the separating element is flexible. In this way, tolerance compensation is possible, namely by deforming the separating element, in particular elastically. Due to the flexibility, a required force is comparatively low.

For example, an intact separating element is used during assembly and is perforated by the phase connections, thereby producing a number of main slots corresponding to the number of phase connections, wherein one of the phase connections protrudes through each of the main slots. The manufacture of the separating element is therefore simplified. In this way, the individual components also do not need to be matched to one another, and so comparatively great production tolerances can be selected. Alternatively, the separating element already has perforations which are separated by the phase connections upon insertion. Therefore, the main slot is always adapted to the actual size of the phase connections that are used and the separating element can be used for a plurality of different electric motors. Alternatively, a number of main slots corresponding to the number of phase connections is introduced prior to the phase connections having been passed through into the separating element. At the least, however, the separating element always has a number of main slots which corresponds to the number of phase connections, wherein one of the phase connections protrudes through each of the main slots. Therefore, the size of the main slots is substantially always adapted to the phase connections, which is why particles are reliably prevented from passing through the openings by the separating element. The main slots are always circumferentially closed, and so the main slots are comparatively stable. In this way, a comparatively large portion of the openings of the separating element is also covered and the separating element is comparatively stable. Alternatively, the separating element is recessed on the edge up to the openings, thereby facilitating assembly.

For example, the main slots are always adapted to the cross-section of the phase connections and/or, for example, are substantially straight. It is particularly preferred when one further slot opens into each of the main slots, the further slot extending, at least partially, not in parallel to the main slot, and forming, for example, an angle therewith, for example, between 10° and 90°. The phase connections do not protrude through the further slot. Rather, the further slot acts as tolerance compensation, and so an uncontrolled tearing of the particular main slot is avoided. Rejects are therefore reduced. The further slot opens, for example, at the end into the main slot or in the middle. In particular, two further such slots are assigned to each of the main slots, wherein the two further such slots are suitably assigned to different longitudinal sides of the particular main slot. In one further alternative, more than two further such slots are present in each case.

It is particularly preferred for the separating element to be fastened to the housing wall. Therefore, it is not necessary to fasten the separating element to the stator or to the electronics system and these can be produced separately. For example, fixing devices, such as clips, are used for fastening. It is particularly preferred, however, when the separating element has a bonding layer which adheres to the housing wall. In other words, the fastening is established by the bonding layer. Complexity is therefore reduced.

Preferably, the separating element has at least one electrically insulating layer. Due to the electrically insulating layer, a short circuit, in particular a short circuit to ground, with the housing wall is avoided. The separating element is advantageously disposed between the housing wall and the stator. If present, the bonding layer is advantageously disposed between the electrically insulating layer and the housing wall. The electrically insulating layer is advantageously made of a polyester. Preferably, the separating layer is film-like, and so the electrically insulating layer is made of a polyester film. Manufacturing costs are reduced in this way.

It is suitable for the separating element to have a layer which has an electrically shielding effect. Electromagnetic waves are shielded by the layer. To this end, the electrical layer is advantageously electrically guided to ground and, for example, connected to the housing wall. In this way, electromagnetic compatibility is increased and it is not necessary to adapt the electronics system accordingly. Comparatively cost-effective components can therefore be used for this purpose. Alternatively or in combination therewith, the layer has a magnetically shielding effect. The layer therefore has paramagnetic or diamagnetic properties. In this way, the formation of magnetic fields generated by the stator in the electronics system is prevented or at least reduced, and so the individual components of the electronics system do not need to be shielded accordingly. In this way, comparatively cost-effective components can therefore be used. In order to provide the particular shielding effect, for example, an integral part of the separating element is metallized and/or coated, and so the layer is created. Alternatively, the layer is made of a plastic or the like, in which particles are embedded, through the use of which the appropriate effect is provided.

Other features which are considered as characteristic for the invention are set forth in the appended claims.

Although the invention is illustrated and described herein as embodied in an electric motor of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
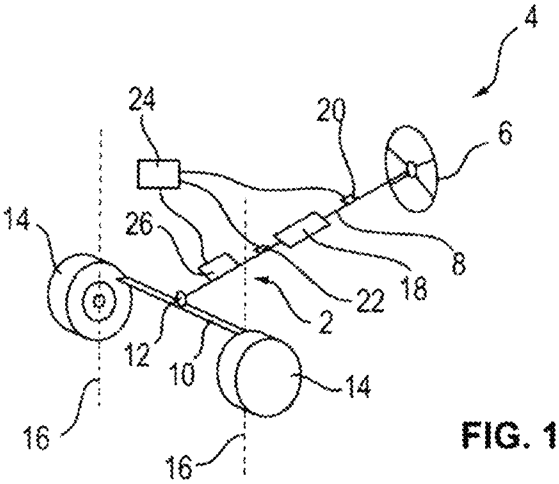
FIG. 1 is a diagrammatic, perspective view of an electric steering system of a motor vehicle, including an electric motor.

Referring now in detail to the figures of the drawings, in which mutually corresponding parts are provided with the same reference characters, and first, particularly, to FIG. 1 thereof, there is seen a diagrammatically simplified view of an adjustment drive 2 of a motor vehicle 4 in the form of an electric steering system (power steering system). The motor vehicle 4 has a steering wheel 6 which is coupled to a toothed rack 10 by a steering track rod 8 and a pinion 12. The toothed rack 10 is coupled to two front wheels 14, each of which is to be pivoted about a substantially perpendicularly extending axis 16 when the steering wheel 6 is turned for steering. The steering track rod 8 is split into two parts which are connected to each other by a rod 18. A first sensor 20 is assigned to the part of the steering track rod 8 located between the rod 18 and the steering wheel 6 and a second sensor 22 is assigned to the part of the steering track rod 8 located between the pinion 12 and the rod 18, the first sensor 20 and the second sensor 22 being connected to a control unit 24 by signaling.

Moreover, an electric motor 26 is assigned to the part of the steering track rod 8 located between the pinion 12 and the rod 18. The electric motor 26 is controlled by the control unit 24 and is configured as a brushless DC motor (BLDC). An angular offset between the two parts of the steering track rod 8 is detected by the two sensors 20, 22 and therefore a desired steering angle of the front wheels 14 is ascertained. If the angular offset is present, the electric motor 26 is energized in such a way that the rotation of the steering track rod 8 is assisted.

Figure 2:
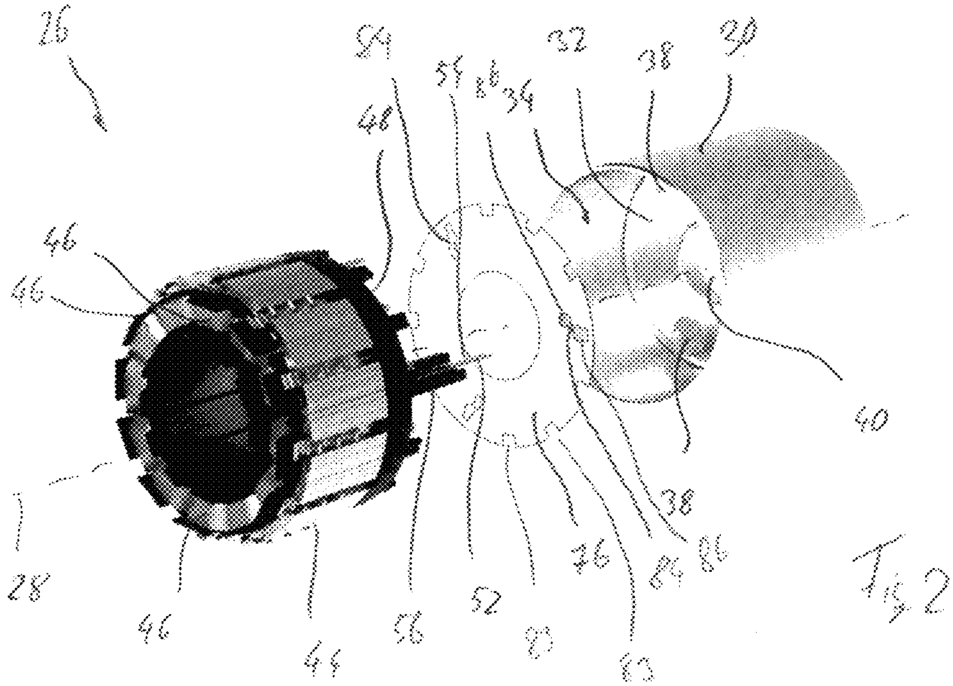
FIG. 2 is an exploded, perspective view of sections of the electric motor, which includes a separating element.
Figure 3:
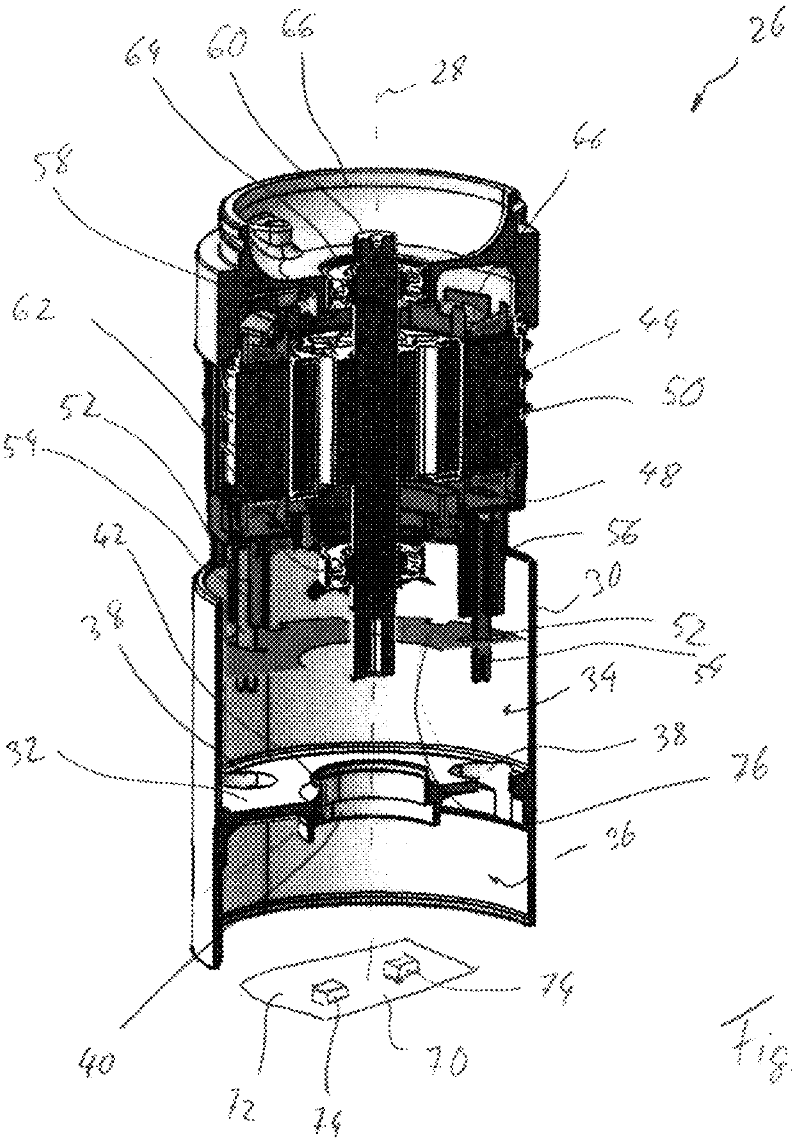
FIGS. 3 and 4 are longitudinal-sectional views of the electric motor.

FIG. 2 shows an exploded representation of the electric motor 26 in sections, wherein the individual integral parts are pulled apart from one another along a longitudinal axis 28. In FIG. 3, the electric motor 26 is shown in a longitudinal section along the longitudinal axis 28 in a partially pulled-apart state and, in FIG. 4, in a longitudinal section along the longitudinal axis 28 in a joined state. The electric motor 26 has a housing 30 which has been made of aluminum in a cold extrusion process. The housing 30 is substantially hollow cylindrical and has a round base surface, the axis of the cylinder coinciding with the longitudinal axis 28. The housing has a housing wall 32 which is disposed perpendicularly to the longitudinal axis 28 and is integral with and disposed inside of the hollow cylinder. The housing wall 32 is disposed between the two ends of the hollow cylinder, forming a motor compartment 34 and an electronics compartment 36, which are separated from each other by the housing wall 32.

The housing wall 32 has three openings 38 which have a circular cross-section and which connect the motor compartment 34 and the electronics compartment 36 to each other. The openings 38 are offset from the longitudinal axis 28 and a cut-out 40 is introduced into the housing wall 32 in the center with respect to the longitudinal axis 28 and is delimited by a collar 42. The collar 42 is a hollow cylindrical section which is disposed concentrically to the longitudinal axis 28 and which delimits the cut-out 40 at its radially outer end.

The electric motor 26 also has a stator 44 which includes multiple electrical coils 46 which are connected by an interconnection ring 48 to form a total of three phases. The electrical phases are connected by the interconnection ring 48 to form a delta connection. The electrical coils 46 are each on a laminated core and are joined to form a circular structure 50 and are stabilized with respect to one another. The axis of each of the electrical coils 46 is disposed on a radial straight line with respect to the longitudinal axis 28.

The interconnection ring 48 forms one of the end faces of the stator 44 and three phase connections 52 are in electrical contact with and fastened to the interconnection ring 48. The phase connections 52 extend parallel to the longitudinal axis 28 and are offset with respect to one another by 120° with respect to the longitudinal axis 28. Each of the phase connections 52 has a copper sheet strip 54, each of which is stabilized by a mounting 56 made of a plastic. The mounting 56 is integrally formed on a part of the interconnection ring 48 which is also made of a plastic, and is integral therewith. Each of the copper sheet strips 54 is in electrical contact with an assigned electrical conductor of the interconnection ring 48, which is used to electrically contact the electrical coils 46. In the assembled state, each phase connection 52, namely the particular copper sheet strip 54, protrudes at the end through one assigned opening 38 into the electronics compartment 36.

A rotor 58 is surrounded by the stator 44 and has a laminated core and multiple permanent magnets fastened thereto. The rotor 58 is fastened to a motor shaft 60, which is disposed along the longitudinal axis 28. The motor shaft 60, the rotor 58 and the stator 44 are disposed concentrically to the longitudinal axis 28. The motor shaft 28 is mounted by a B-side bearing 62 and an A-side bearing 64 so as to be rotatable about the longitudinal axis 28. The B-side bearing 62 is guided on the housing wall 32 and is therefore a floating bearing. To this end, the B-side bearing 62 is inserted into the collar 42. The motor shaft 60 protrudes through the housing wall 32 into the electronics compartment 36. The A-side bearing 64 is fastened to an A-side bearing shield 66, through the use of which the motor compartment 34 is closed on the side opposite the housing wall 32. To this end, the A-side bearing shield 66 is placed onto the edge of the housing 30 and fastened there.

Figure 4:
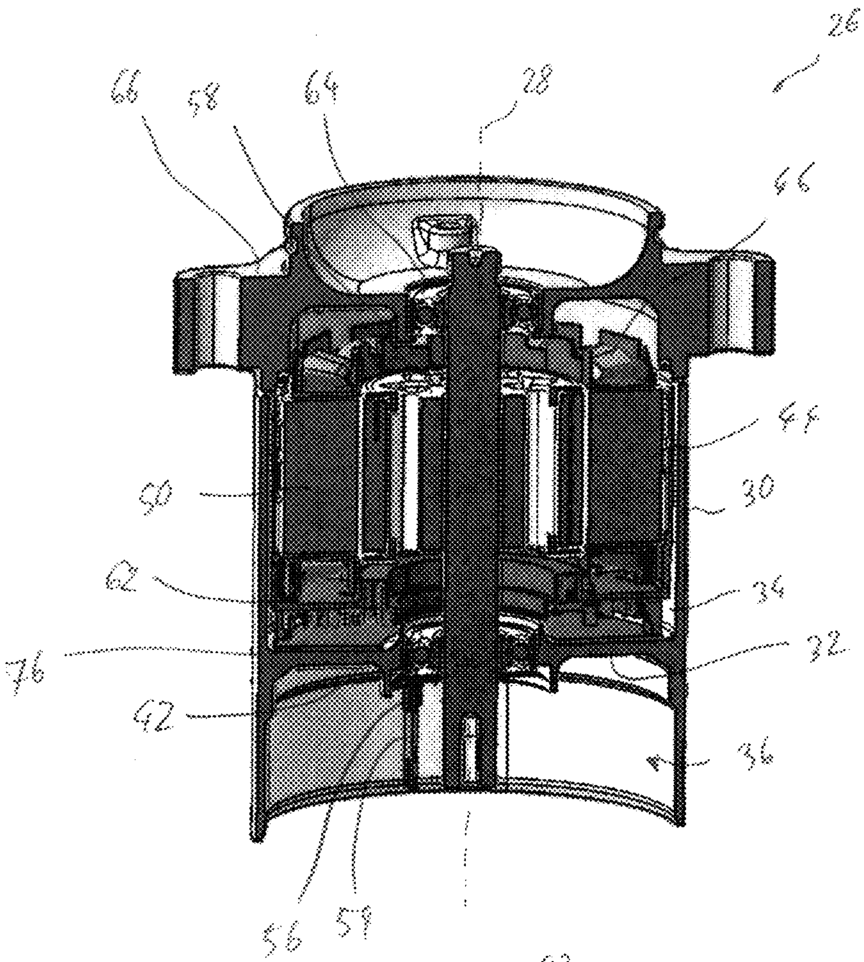

An electronics system 70 is disposed in the electronics compartment 36, the electronics system 70 not being shown in greater detail in FIG. 4. The electronics system 70 has a printed circuit board 72, on which multiple semiconductor switches 74 are disposed, of which two are shown. The semiconductor switches 74 are connected to one another to form a B6 circuit and the semiconductor switches 74 are activated by using further electrical/electronic components which are also fastened to the printed circuit board 72. In the assembled state, the phase connections 52 are in electrical contact with the electronics system 70, so that the electrical coils 46 can be energized by using the electronics system 70. The electronics system 70 is therefore used to energize the electrical coils 46. In other words, the stator 44 and the electronics system 70 are in electrical contact with each another.

Figure 5:
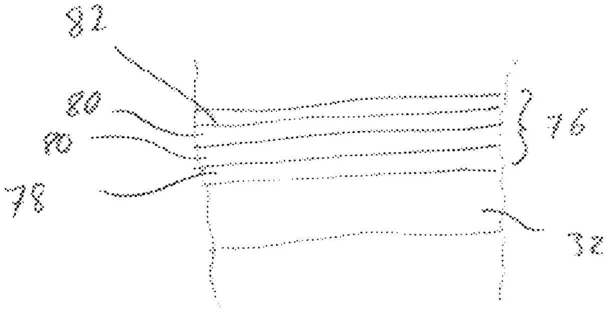
FIG. 5 is a fragmentary, longitudinal-sectional view of the separating element.

A separating element 76, which is disposed perpendicularly to the longitudinal axis 28, is disposed between the electronics system 70 and the stator 44. The separating element 76 is disposed in the motor compartment 34 and, therefore, is disposed between the housing wall 32 and the stator 44. The separating element 76 is made of a film and thus is film-shaped and is adhesively bonded to the housing wall 32. To this end, the separating element 76, as shown in FIG. 5 in a sectional representation along the longitudinal axis 28, has a bonding layer 78 which adheres to the housing wall 32. Two layers 80 are mounted on the bonding layer 78 and are stacked one on top of the other. One of the layers 80 has an electrically shielding effect. To this end, this layer 80 is made of an electrically conductive material and is electrically contacted to ground. The further layer 80 has a magnetically shielding effect and is made of a plastic, into which diamagnetic particles are introduced. In a variant which is not shown in greater detail, the two layers 80 are not present.

However, the separating element 76 always has an electrically insulating layer 82 which is made of a polyester film. Therefore, if the two layers 80 are not present, only the insulating layer 82, i.e., the polyester film, and the bonding layer 78 are present.

The thickness of the separating layer 76 is less than 0.1 mm and the separating element 76 is flexible. The separating element 76 has an annular cross-section, wherein the outer diameter of the separating element 76 is slightly smaller than the inner diameter of the motor compartment 34, i.e., of the housing 32, and the inner diameter is slightly greater than the outer diameter of the collar 42. Multiple notches 83 are introduced into the periphery of the separating element 76 and are enclosed by projections (not shown in greater detail) on the housing wall 32. A rotation lock is therefore established.

In the assembled state, the openings 38 and the housing wall 32 are covered by the separating element 76 and, therefore, the phase connections 52 protrude through the separating element 76. To this end, the separating element 76 has three main slots 84, which are introduced into the separating element 26 by cutting or punching. Each of the main slots 84 extends substantially radially with respect to the longitudinal axis 28 and one of the phase connections 52 is assigned to each of the main slots 84. Therefore, one of the phase connections 52 in each case protrudes through each of the main slots 84. Two further slots 86 open into each of the main slots 84. The two further slots 86 are disposed at opposite ends of the main slot 84 and extend obliquely, i.e., not in parallel, to the main slot 84. A Z-shape is therefore realized by each of the main slots 84 and the associated further slots 86.

Due to the insulating layer 82, a short circuit to ground, i.e., a short circuit of the stator 44 by the housing wall 32, is also prevented when the stator 44 approaches the housing wall 32. Safety of the electric motor 26 is therefore increased. Since the openings 38 are partially covered by the separating element 76, a passage of particles out of the motor compartment 34 into the electronics compartment 36 is prevented or at least made difficult in the area of the phase connections 52. Therefore, a comparatively cost-effective electronics system 70 can be used. Tolerance compensation is also created by the flexible separating element 76. In order to avoid the passage of the particles, it is merely necessary to at least partially cover the openings 38 by the separating element 76. Provided that the openings 38 are selected to be comparatively large, it is possible to select comparatively large production tolerances for the housing 30 and for the phase connections 52 and the stator 44, wherein the passage of particles is nevertheless prevented. An electrical short circuit between the phase connections 52 and the housing wall 32 through the air gap which is formed in this way is also prevented due to the enlarged openings 38. In addition, air is permitted to pass due to the at least partial air permeability through the separating element 76, at least in the area of the main slots 84, which is why the motor compartment 34 can be ventilated.

Figure 6:
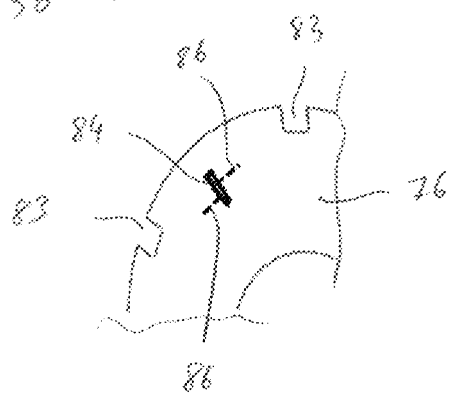
FIG. 6 is a fragmentary, plan view of one alternative embodiment of the separating element.

FIG. 6 shows a modification of the separating element 76 in part. The main slot 84 shown, of which three are once again present, still extends radially. The two further slots 86 are located on opposite longitudinal sides of the main slot 84 and extend perpendicularly to the main slot 84. It is therefore made possible to guide through the separating element 76 without the separating element 76 tearing in an uncontrolled manner also for the case in which the phase connections 52 are not aligned with the main slot 84 prior to insertion. In further variants which are not shown in greater detail, the notches 83 are not present. Any other type of modification is advantageously not carried out.

Figure 7:
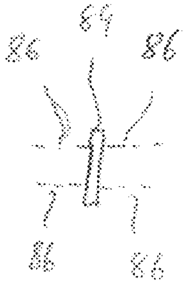
FIGS. 7, 8 and 9 are fragmentary, plan views of further alternatives of the separating element.

FIG. 7 shows one further alternative in part. Four further slots 86 are now assigned to the main slot 84 shown, wherein two of the slots 86 are located on the same side, in each case, with respect to the main slot 84. The further slots 86 are disposed perpendicularly to the main slot 84.

Figure 8:

FIG. 8 shows a modification of the variant shown in FIG. 7. The four further slots 86 are once again present, wherein the slots 86 are slanted, however, by 45° with respect to the main slot 84. A herringbone pattern is therefore realized.

Figure 9:

FIG. 9 shows one further alternative. Four further slots 86 are assigned to each of the sides of the main slot 84, and so, overall, eight such further slots 86 are present.

The invention is not limited to the above-described exemplary embodiments. Rather, other variants of the invention can also be derived therefrom by a person skilled in the art without departing from the subject matter of the invention. In particular, all individual features described in conjunction with the individual exemplary embodiments are also combinable with one another in another way without departing from the subject matter of the invention.

The following is a summary list of reference numerals and the corresponding structure used in the above description of the invention.

LIST OF REFERENCE CHARACTERS

2 adjustment drive
4 motor vehicle
6 steering wheel
8 steering track rod
10 toothed rack
12 pinion
14 front wheel
16 axis
18 rod
20 first sensor
22 second sensor
24 control unit
26 electric motor
28 longitudinal axis
30 housing
32 housing wall
34 motor compartment
36 electronics compartment
38 opening
40 cut-out
42 collar
44 stator
46 electrical coil
48 interconnection ring
50 circular structure
52 phase connection
54 copper sheet strip
56 mounting
58 rotor
60 motor shaft
62 B-side bearing
64 A-side bearing
66 A-side bearing shield
70 electronics system
72 printed circuit board
74 semiconductor switch
76 separating element
78 bonding layer
80 layer
82 insulating layer
83 notch
84 main slot
86 further slot

The invention claimed is:

1. An electric motor or a steering motor of a motor vehicle, the electric motor comprising:

a housing having a motor compartment, an electronics compartment and a housing wall separating said motor compartment and said electronics compartment from each other, said housing wall having a plurality of openings formed therein;

a stator disposed in said motor compartment and an electronics system disposed in said electronics compartment;

phase connections protruding through said openings and placing said stator and said electronics system in electrical contact with each other; and a separating element being film-shaped and being disposed between said stator and said electronics system, said separating element at least partially covering said openings and said housing wall, said separating element including at least one electrically insulating layer, and said separating element including an additional layer having an electrically shielding effect, said additional layer being made of an electrically conductive material and being electrically contacted to ground.

2. The electric motor according to claim 1, wherein said separating element is disposed between said housing wall and said stator.

3. The electric motor according to claim 1, which further comprises a number of said phase connections and a number of main slots formed in said separating element corresponding to said number of phase connections, each of said phase connections protruding through a respective one of said main slots.

4. The electric motor according to claim 3, which further comprises further slots, at least a respective one of said further slots opening into each of said main slots, and said further slots extending nonparallel to said main slots.

5. The electric motor according to claim 1, wherein said separating element has a bonding layer adhering to said housing wall.

6. The electric motor according to claim 1, wherein said additional layer has a magnetically shielding effect.

7. The electric motor according to claim 1, wherein said separating element has a thickness of between 0.1 mm and less than 0.5 mm.

8. The electric motor according to claim 1, wherein said separating element is flexible.

9. The electric motor according to claim 1, which further comprises an interconnection ring forming an end face of said stator.

* * * * *